United States Patent Office 2,765,617
Patented Oct. 9, 1956

2,765,617
METHOD OF OPERATING A TURBOJET ENGINE

Earl W. Gluesenkamp and Milton Kosmin, Dayton, Ohio, assignors to Monsanto Chemical Company, St. Louis, Mo., a corporation of Delaware No Drawing. Application October 22, 1952,
Serial No. 316,312

9 Claims. (Cl. 60—35.4)

This invention relates to improved high energy fuels, and particularly aviation fuels. More specifically, it relates to fuels for aircraft turbojet and turboprop engines and to an improved method of operating such engines.

One object of the invention is to provide a hydrocarbon fuel for turbojet engines of substantially increased power output per unit volume over the hydrocarbon fuels of the prior art.

Another object of the invention is to provide a hydrocarbon fuel for jet engines having a heat of combustion of from 125,000 to 160,000 and preferably from 136,000 to 150,000 B. t. u.'s per gallon.

Another object of the invention is to provide a hydrocarbon fuel for jet engines having a pour point (ASTM D97–34) not substantially above 5° C. and preferably below —40° C.

An additional object of the invention is to provide a hydrocarbon fuel for jet engines having a specific gravity from 0.85/30° C. to 1.5/30° C., and preferably from 0.90/30° C. to 1.00/30° C.

An additional object of the invention is to provide a hydrocarbon fuel for jet engines having a flash point (ASTM D92–33) of from about 63° C. to about 194° C., and preferably from about 120° C. to about 182° C.

A further object of the invention is to provide a hydrocarbon fuel for jet engines having a flame point (ASTM D92–33) of from about 69° C. to about 200° C. and preferably from about 121° C. to about 185° C.

A still further object of the invention is to provide a hydrocarbon fuel for jet engines having a boiling point within the range of about 180° C. to about 400° C., and preferably in the range of about 250° C. to about 350° C., at atmospheric pressure.

A still further object of the invention is to provide a hydrocarbon fuel for jet engines which combines in a single product all of the foregoing properties.

A still further object of the invention is to provide an improved method of operating jet engines, particularly turbojet and turboprop aircraft engines.

Other objects and advantages will become apparent to those skilled in the art as the description of the invention proceeds.

Mixtures of straight-chain and/or branched chain aliphatic hydrocarbons have been and are being used as fuels for aircraft engines and while they have enjoyed a considerable amount of success, they are subject to a number of disadvantages which substantially restrict their range of utility.

One serious disadvantage of these fuels is that they have a heat of combustion of about 112,000 B. t. u. per gallon and no one has been able, so far as we are aware, to improve this figure, that is, to raise it above 112,000 B. t. u. per gallon and at the same time obtain the other characteristics necessary for a jet fuel. With the current trend in aircraft design, this presents a problem as to the use of such fuels in military or commercial aircraft. For example, aircraft generally, and particularly military aircraft, are being designed for higher and higher speeds. Accordingly, the wing sections are getting thinner and thinner and there is increasingly less space for storage of fuel in the wings. Consequently, these fuels are being stored in the fuselage of such aircraft. This presents a safety hazard and also a problem of maintaining the center of gravity of such aircraft and, therefore, specially designed equipment is installed to automatically and continuously alternate the use from one tank to another maintain the center of gravity.

Another disadvantage of these fuels is that they have high vapor pressures and tend to flash off rapidly as the aircraft gains altitude. This can be overcome by pressurizing the fuel tanks, but if this is done, it is necessary to increase their structural strength which means adding weight to the aircraft. Moreover, in the case of self-sealing tanks, pressurizing does not satisfactorily solve the problem since this causes loss of protection from the self-sealing action.

We have found that motor fuels which are free of the above described disadvantages may be compounded by initially providing a mixture of unsaturated polycyclic hydrocarbons and then hydrogenating this mixture until its specific gravity is decreased to a value in the range of about 0.85 to about 1.5 and preferably in the range of about 0.90 to about 1.0 at 30° C. Stated in a somewhat different manner, the unsaturated polycyclic hydrocarbon mixture is hydrogenated until its heat of combustion attains a value of about 125,000 to about 160,000, and preferably about 136,000 to about 150,000 B. t. u. per gallon. The products thus obtained are partially or substantially completely hydrogenated depending upon the degree of unsaturation of the particular unsaturated polycyclic hydrocarbon mixture employed. These products are further characterized by having a pour point (ASTM D97–34) not substantially above 5° C.

As an alternative to the foregoing method, partially and/or substantially completely hydrogenated polycyclic hydrocarbons may be blended to yield a hydrocarbon mixture which meets the above specifications with respect to specific gravity and heat of combustion.

The unsaturated polycyclic hydrocarbon mixture to be hydrogenated includes two or more compounds which may be simple, fused or alkylated polycyclic hydrocarbons. This mixture may be prepared synthetically by mixing together two or more of these hydrocarbons; by pyrolysis of mono- and/or polycyclic hydrocarbons; by extracting, distilling or otherwise separating the polycyclic aromatic hydrocarbons from coal tar or petroleum fractions; by separating the monocyclic aromatic hydrocarbons from coal tar and subjecting them to pyrolysis; by removing the monocyclic hydrocarbons from petroleum and pyrolyzing them; and by recovering the fractions rich in toluenes and/or xylenes produced in hydroforming and platforming operations and subjecting them to pyrolysis.

For a more complete understanding of the present invention, reference is made to the following illustrative examples.

*Example I*

Toluene vapor was continuously introduced into an electrically heated, coiled, stainless steel tube and preheated to a maximum temperature of about 705° C. This preheated vapor was continuously charged to an electrically heated, coiled, constant temperature stainless steel tube reactor which had a length of 16.7 feet and an inside diameter of 1 inch and continuously pyrolyzed at a temperature of 705° C. which was maintained throughout the length of the reactor tube. The sojourn time of the reactant and pyrolysis products was about 8.6 seconds. The hot vapors from the reactor were condensed and fractionally distilled to separately recover un reacted toluene and a crude pyrolysate boiling above 200° C./760 mm.

600 grams of the distilled pyrolysate (B. P. 260° C./ 760 mm. to 195° C./3 mm. Hg) was mixed with about 32 parts of nickel obtained from the decomposition of nickel formate. This mixture was hydrogenated for 2¾ hours under 300 p. s. i. g. hydrogen pressure at temperatures ranging from about 133° C. up to 215° C. This resulted in the production of 509 grams of a clear liquid having the following properties.

Specific gravity at 30° C_____ 0.907.
Heat of combustion_____ 18,100 B. t. u./lb.,
  136,800 B. t. u./gal.
Pour point_____ <−70.6° C.
Flash point_____ 129.4° C.
Flame point_____ 129.4° C.
Distillation range_____ 260° C./760 mm.–195° C./3 mm.

*Example II*

A vaporized mixture of toluene and benzene in a 2:1 molar ratio was continuously fed for 2 hours into the preheater described in Example I and preheated to a maximum temperature of about 705° C. This preheated vaporized mixture was continuously introduced into the constant temperature reactor employed in the preceding example and continuously pyrolyzed at a temperature of about 705° C. which was maintained throughout the length of the reactor tube. In this reaction, the sojourn time of the reactants and pyrolysis products in the reactor was about 5.1 seconds. The hot pyrolysis products from the reactor were condensed and fractionally distilled to separately recover unreacted benzene and toluene and a residue of crude pyrolysate which was then distilled to yield a product boiling within the range of about 250° C./760 mm. to 250° C./2 mm. Hg.

470 grams of the resulting distilled pyrolysate was mixed with the nickel obtained by decomposing 100 grams of nickel formate. This mixture was hydrogenated for 2 hours under 350 p. s. i. g. hydrogen pressure at temperatures ranging from about 100° C. up to 235° C. and a clear liquid product was obtained having the following physical properties:

Specific gravity at 30° C_____ 0.897.
Heat of combustion_____ 18,070 B. t. u./lb.,
  35,400 B. t. u./gal.
Pour point_____ <−70.6° C.
Flash point_____ 121.1° C.
Flame point_____ 121.1° C.
Distillation range_____ 250° C./760 mm.–180° C./3 mm.

*Example III*

A vaporized isomerized mixture of xylenes (commercial grade) was continuously conducted into the preheater used in Example I and preheated to a maximum temperature of about 600° C. This preheated vaporized mixture of xylenes was continuously conveyed through the constant temperature reactor and continuously pyrolyzed at a temperature of 600° C. which was maintained throughout the reactor tube. The sojourn time of the reactants and pyrolysis products in the reactor was about 15.5 seconds. The hot vapors from the reactor were condensed and the condensate distilled to remove the unreacted xylenes. The resulting residue was distilled, refluxed for 5 hours with metallic sodium to remove sulfur compounds, separated from the resulting residue, and redistilled from fresh sodium to yield a clear yellow liquid boiling from about 170° C./760 mm. to about 275° C./2 mm.

400 grams of the purified pyrolysate was mixed with 32 grams of nickel catalyst and heated under 300 p. s. i .g. hydrogen pressure for 4 hours at a temperature of from about 200° C. to about 225° C. The hydrogenated product was removed from the catalyst, mixed with a fresh portion of catalyst and further hydrogenated for an additional 3 hours. This resulted in the production of a clear, mobile, liquid product having the following properties:

Specific gravity at 30° C__ 0.907.
Heat of combustion_____ 17,997 B. t. u./lb.,
  136,100 B. t. u./gal.
Pour point_____ <−67.8° C.
Flash point_____ 115.6° C.
Flame point_____ 118.3° C.
Distillation range_____ 195° C.–310° C./760 mm.

*Example IV*

681 grams of a mixture of 60% ortho-terphenyl and 40% meta-terphenyl was mixed with nickel prepared from 100 grams of nickel formate. The resulting product was hydrogenated at pressures between 300 and 710 p. s. i. g. at temperatures ranging from about 80° C. up to 250° C. for 8½ hours. The hydrogenated product was filtered from the cataylst to yield a colorless liquid possessing the following physical properties:

Specific gravity at 30° C____ 0.937.
Heat of combustion_____ 18,188 B. t. u./lb.,
  142,000 B. t. u./gal.
Pour point_____ −40° C.
Flash point_____ 182.2° C.
Flame point_____ 185° C.
Distillation range_____ 337° C.–350° C./760 mm.

*Example V*

A mixture of normally solid hydrocarbons boiling above 350° C. at 760 mm. pressure and formed in the synthesis of biphenyl by the pyrolysis of benzene was subjected to hydrogenation in the presence of a nickel catalyst until a partially hydrogenated product was obtained having the following properties:

Specific gravity at 30° C__ About 1.004.
Heat of combustion_____ 145,500 B. t. u./gal.
Pour point_____ +5° C.
Flash point_____ 194° C.
Flame point_____ 200° C.
Distillation range_____ About 340 to about 396° C.

The products of the instant invention are characterized by having the following combination of properties which render them eminently suitable for use as high energy fuels for aircraft engines, and particularly for turbojet engines:

(1) A heat of combustion within the range of 125,000 to 160,000 B. t. u. per gallon
(2) A specific gravity at 30° C. in the range of 0.85 to 1.5
(3) Low vapor pressure or high boiling point
(4) Low viscosity
(5) Low pour point
(6) Substantially no sulfur or vanadium compounds
(7) No water
(8) Burn cleanly without substantial formation of solid combustion products
(9) Uniform materials with relatively narrow boiling range
(10) Substantially free from straight chain and/or branched chain aliphatic hydrocarbons except when blended with other materials in the manner subsequently described
(11) Substantially non-corrosive
(12) Substantially non-gum forming.

Moreover, it will be noted from Examples I–V, inclusive, that the products of this invention are markedly superior to the aliphatic hydrocarbon-turbojet fuels of the prior art in that the former in many instances have lower vapor pressures and in all instances substantially higher heats of combustion than the latter. Therefore, the products of this invention are in many cases more suitable for high altitude flying and, at the same time, provide in all cases the same energy output with a smaller volume of fuel than the aliphatic hydrocarbon turbojet fuels, thus substantially eliminating the fuel storage problem and its attendant disadvantages. In addition, in many instances, the fuels of the instant invention have low pour points equivalent to or lower than present aliphatic hydrocarbon turbojet fuels and hence provide another important advantage over the latter from the standpoint of cold weather and high altitude flying.

The products of this invention essentially comprise partially to subtsantially completely hydrogenated polycyclic hydrocarbons in which the cyclic radicals are preferably joined directly to each other or by aliphatic radicals containing up to two carbon atoms. However, it is also within the broad scope of the invention to include in these products small amounts of polycyclic hydrocarbons in which the cyclic radicals are joined to each other by aliphatic radicals containing from 3 to about 8 carbon atoms so long as the specific gravity and heat of combustion of the product are not reduced below 0.85/30° C. and 125,000 B. t. u. per gallon, respectively.

As indicated earlier herein, the unsaturated polycyclic hydrocarbon mixtures used as starting materials in the production of the instant fuels may be obtained directly from various sources or by the pyrolysis of various unsaturated mono- and/or polycyclic hydrocarbons. However, it is preferred to obtain these starting materials from petroleum by means of platforming or hydroforming operations since in time of peace or war, the availability of these materials and the fuels made therefrom would be greatly increased and the transportation costs markedly reduced.

The fuels of the instant invention are eminently suitable for use in jet engines, particularly turbojet and turboprop aircraft engines.

In the operation of turbojet engines, air is withdrawn from the atmosphere into an air compressor, compressed and delivered to the combustion chamber of the engine where it is mixed with these fuels and the product ignited. The resulting burning mixture of fuel and air is diluted with secondary air and expanded through a turbine which drives the air compressor. In these engines, the hot mixture is expanded in the turbine in such a manner that only sufficient energy is extracted from the gases to operate the compressor. The remaining energy is employed to eject the gases in jet form through a jet pipe into the atmosphere and thereby produce thrust.

In using these fuels in turboprop engines, the operation is essentially the same except that the gases are almost completely expanded in the turbine, i. e., they are expanded almost down to the pressure of the surrounding atmosphere, leaving only a relatively small amount of energy to produce thrust when ejected through the jet pipe. Thus, in turboprop engines, the majority of the energy from the hot expanding gases is used to operate the compressor and the propeller and hence the thrust is obtained primarily from the latter.

In many turbojets and turboprop engines, only a single stage turbine is employed. However, more than a single stage may be employed and, if so, guide vanes are introduced between each pair of turbine wheels. After leaving the last turbine wheel, the gas enters the jet pipe and is discharged therefrom into the atmosphere.

In the operation of these engines using the fuels of the instant invention, the fuel and air are charged into the combustion chamber in an initial weight ratio of fuel to air which is substantially in the range of about 0.06 to about 0.11, the particular ratio selected being dependent upon the power requirements at the moment. This mixture is supplemented by secondary air in an amount providing an overall fuel to air weight ratio which does not substantially exceed 0.02 at the entrance to the turbine wheel. Fuel/air weight ratios substantially higher than 0.02 are not desirable since they result in the production of temperatures which cannot be tolerated by turbines with present materials of construction.

The use of any of the products described in the examples provides a new method of operating jet engines having all of the advantages over prior jet fuels which are set forth earlier herein.

The fuels of the instant invention may be used advantageously in the spark ignition piston-type aircraft engine, Diesel engines, and turbine engines generally, but are particularly suitable for use in ram jet, turbojet and turboprop aircraft engines. However, when the piston-type and Diesel engines are employed, the fuel/air ratios are adjusted so as to achieve substantially complete combustion of the air and fuel which means that these ratios fall within the limits of about 0.045 to about 0.110 and preferably within the limits of about 0.066 to about 0.08.

The fuels of the instant invention may be blended with other materials such as gasolene, kerosene, mixtures of gasolene and kerosene, other aviation fuels, and with present hydrocarbon jet fuels to produce an improved fuel over the presently available fuel. More particularly, the fuels described herein may be added to the present aliphatic hydrocarbon jet fuels having a heat of combustion of about 112,000 B. t. u. per gallon to raise the overall heat of combustion thereof to at least about 120,000 B. t. u. or 125,000 B. t. u. per gallon. Moreover, the fuels described herein may be used in combination with fuel additives to obtain improved results as regards burning characteristics, etc.

The heat of combustion as given in this specification represents the heat of reaction between gaseous oxygen and liquid hydrocarbon to produce gaseous carbon dioxide and water.

While we have disclosed the preferred embodiments of our invention, it will be readily apparent to those skilled in the art that many changes and variations may be made without departing from the spirit thereof.

What we claim is:

1. A method of operating a turbo jet engine which comprises feeding a mixture of air and a hydrogenated polycyclic hydrocarbon mixture having a specific gravity of from about 0.85 at 30° C. to about 1.5 at 30° C., a pour point not substantially above 5° C., and a heat of combustion of at least 125,000 B. t. u. per gallon into the combustion chamber of said engine, subjecting said mixture to combustion, passing the resulting hot gases through a turbine to expand the same and then passing the hot gases into the atmosphere by way of a nozzle, whereby thrust is produced.

2. The method defined in claim 1 in which the hydrogenated polycyclic hydrocarbon mixture has a specific gravity in the range of about 0.9 to about 1.0 at 30° C., a heat of combustion of from about 136,000 B. t. u. to about 150,000 B. t. u. per gallon and a pour point not substantially above 5° C.

3. The method defined in claim 1 in which the hydrocarbon is a product obtained by the hydrogenation of a member selected from the group consisting of (1) pyrolyzed toluene, (2) pyrolyzed mixtures of benzene and toluene, (3) pyrolyzed mixtures of xylene, (4) mixtures of ortho- and meta-terphenyl, and (5) mixtures of normally solid hydrocarbons boiling above 350° C. at 760 mm. and formed in the synthesis of biphenyl by the pyrolysis of benzene at elevated temperatures.

4. The method defined in claim 1 wherein the hydrocarbon is the substantially completely hydrogenated pyrolysate of toluene.

5. The method defined in claim 1 in which the hydrocarbon is a hydrogenated pyrolysate of toluene having the following properties:

| | |
|---|---|
| Specific gravity at 30° C. | 0.907. |
| Heat of combustion | 136,800 B. t. u./gal. |
| Pour point | Lower than −70.6° C. |
| Flash point | 130° C. |
| Flame point | 130° C. |
| Distillation range | 260° C./760 mm.— 195° C./3 mm. |

6. The method defined in claim 1 wherein the hydrocarbon is the substantially completely hydrogenated pyrolysate of a mixture of benzene with toluene.

7. The method defined in claim 1 wherein the hydrocarbon is the substantially completely hydrogenated pyrolysate of a mixture of xylenes.

8. The method defined in claim 1 in which the hydrocarbon is a product obtained by the hydrogenation of a pyrolysate of a mixture of xylenes and having the following properties:

Specific gravity at 30° C. -- 0.907.
Heat of combustion ------ 136,100 B. t. u./gal.
Pour point -------------- Lower than −67.8° C.
Flash point ------------- 116.6° C.
Flame point ------------- 118.3° C.
Distillation range ------- 195° C.–310° C./760 mm.

9. The method defined in claim 1 in which the hydrocarbon is a substantially completely hydrogenated mixture of 60% ortho-terphenyl and 40% meta-terphenyl.

References Cited in the file of this patent

UNITED STATES PATENTS

| | | |
|---|---|---|
| 1,749,244 | Fessler | Mar. 4, 1930 |
| 1,932,186 | Pier et al. | Oct. 24, 1933 |
| 2,344,258 | Miles | Mar. 14, 1944 |
| 2,364,719 | Jenkins | Dec. 12, 1944 |
| 2,557,018 | Viles | June 12, 1951 |
| 2,564,504 | Rieke | Aug. 14, 1951 |

OTHER REFERENCES

Kuhn: "The Petroleum Industry and Jet Propulsion," in Aero Digest, February 1948, pp. 70–74.